Patented May 17, 1932

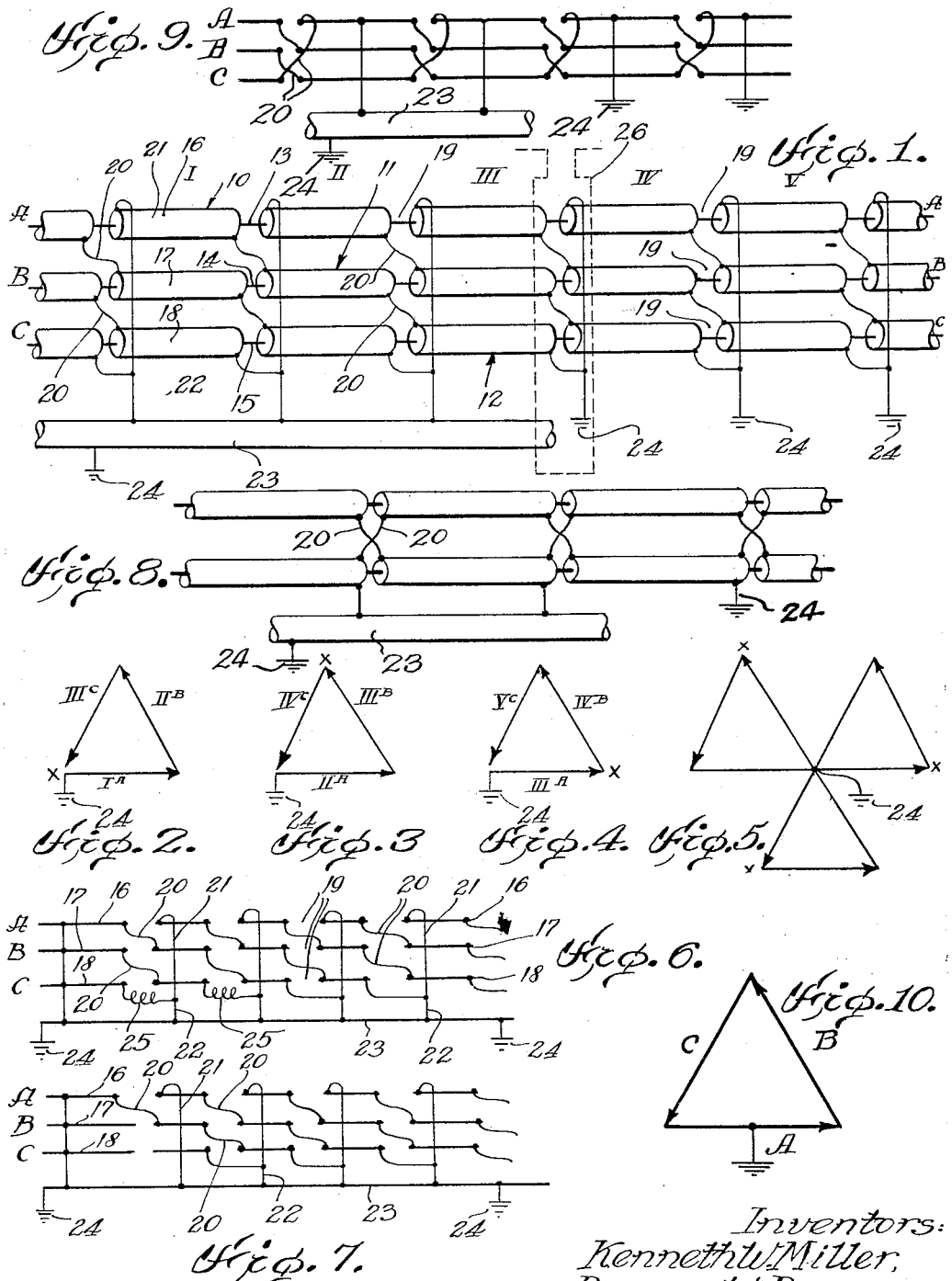

1,858,838

UNITED STATES PATENT OFFICE

KENNETH W. MILLER AND DENNEY W. ROPER, OF CHICAGO, ILLINOIS

CABLE SHEATH BONDING

Application filed March 28, 1930. Serial No. 439,594.

This invention relates to sheath bonding and more particularly to the bonding together of the metallic sheaths of single-conductor underground cables employed in three-phase transmission.

When alternating currents are delivered over the conductors of single-conductor cables enclosed in separate metallic sheaths, there is induced in such cable sheath a voltage which is directly proportional to the conductor current and to the length of each section of cable between manholes. If the sheaths of each of the cables are joined by means of ordinary joint sleeves, and are solidly bonded together in each manhole, electrical continuity of the sheath circuit is preserved, thus providing a closed electrical circuit.

In such case, the induced sheath voltages cause large sheath currents to flow resulting in large heat losses which considerably reduce the current capacity of the cable and consequently add to operating cost. If, however, the sections of the sheaths are insulated from each other and are thereby made discontinuous by means of the interposition of insulating sleeves or joints, potentials will be established between the sections and between a section and ground. By specially connecting the sheaths of the sections by means of bond wires or impedances, sheath currents may be prevented or greatly restricted and sheath losses practically eliminated. In this case, the induced sheath voltages are not consumed in producing sheath currents and are therefore present on the sheath. Various types of suitable insulating sleeves have been devised for interrupting the electrical continuity of the sections of the sheath of such cables and several bonding methods have been devised for connecting the sections of the cable sheaths to prevent sheath losses.

The present invention introduces a new method of connecting the sections and sheaths of single conductor cables which includes the desirable features of a continuous metallic path along the sheath circuit and negligible sheath losses.

Briefly stated, to prevent the accumulation of sheath voltage along the line, the sheath lengths are crossbonded or connected serially in transposed relation by means of bond wires and at every cross-bond location one of the cross bonds is connected to a ground. To secure the benefits of this scheme of connection, the transpositions must be connected in the same phase sequence and the ground connection be similarly connected at every bond location.

The reduction of voltage between cable sheaths is accomplished in our invention, without the use of special sheath bonding devices and this is an important feature of our invention.

The reduction of voltages between cable sheaths is very important since it has been found in field practice that the possibility of sheath corrosion due to A. C. voltages increases very rapidly with the voltages between cable sheaths. Our invention accomplishes this voltage reduction without the requirement of any special apparatus other than a ground in every manhole or an auxiliary ground cable. In ordinary underground construction, other cables are usually present in the same conduits and the sheaths of such cables, which are normally electrically continuous and solidly bonded and grounded, may be employed as the auxiliary ground cable.

In one form of cross-bonding well known in the art in which the three cable sheaths are all solidly bonded together and grounded in every third manhole, we have found that the voltages existing between sheaths are normally two-thirds greater than those existing between sheaths for the form of crossbonding in accordance with our invention. This important feature of our invention is due to the fact that in our method of bonding the voltages between sheaths are the same as if the sections of the sheaths were connected in delta. This is a distinct advantage over other forms of bonding well known to the art, in which the voltage between sheaths is equivalent to that which would result from the star connection of the sections of the sheaths.

With the above in view the principal objects of the present invention are: to reduce induced sheath currents and losses, thereby increasing line rating and reducing operating costs; to avoid accumulative effect of induced sheath voltages along the line; to afford electrical continuity of the sheath circuit, thus providing a return path for fault currents; to hold sheath voltages between cable sheaths to a minimum value consistent with the above aims, thereby reducing the possibility of sheath corrosion to a minimum; and to accomplish the above objects at a minimum cost employing a minimum amount of special equipment.

Other and further objects will appear from the following detailed description of a preferred embodiment of our invention illustrated in the accompanying drawings in which:

Figure 1 is a diagrammatic or schematic view showing a portion of a three-phase cable system bonded in accordance with the present invention;

Figures 2, 3 and 4 are vectorial voltage diagrams illustrating the sheath voltage relations of the system illustrated in Figure 1;

Figure 5 is a vector voltage diagram representing voltages which result with sheaths cross-bonded according to a method already known to the art and in which the three cable sheaths are all solidly bonded together and grounded in every third manhole;

Figure 6 is a schematic wiring diagram for terminating bonding according to our invention at the end of a three-phase transmission line or at a solidly grounded point; and Figure 7 is a schematic wiring diagram for an alternative method of terminating bonding at the end of such a line or at a solidly grounded point.

Figure 8 is a diagrammatic or schematic view showing a single phase cable bonded in accordance with the present invention.

Figure 9 is a schematic wiring diagram illustrating an alternative connection of the ground cable in a three phase cable system bonded in accordance with my invention.

Figure 10 is a vector voltage diagram illustrating the sheath voltage relations of the system illustrated in Figure 9.

In Figure 1 of the drawings, we have schematically illustrated a three-phase cable system comprising three single conductor cables, 10, 11 and 12 comprising conductors 13, 14 and 15 respectively, each covered with a suitable insulation in turn surrounded by metallic sheaths 16, 17 and 18 respectively. The electrical continuity of these sheaths is interrupted in substantially equal lengths by any suitable insulating sleeve or joint schematically illustrated in Figure 1 by gaps 19 between the sections or lengths of each of the cable sheaths.

In order to simplify the disclosure of the invention, the sheath sections in Figure 1 are denoted by Roman numerals I to V serially, and the phases are identified by letters A, B and C.

The ordinary practice in this country is to install cable in conduits with manholes at suitable intervals. One manhole is schematically represented by the dotted rectangle 26 in Figure 1. The insulating joints 19 in the lead sheaths of the cables are usually installed in these manholes and the sheath bonding connections 21, 22, ground 24 (and bonding devices when used) are most conveniently installed in the manholes.

To prevent the accumulation of sheath voltage along the line, the sheath lengths are cross-bonded or serially connected in transposed relation by means of jumpers or bond wires 20. As will be seen from Figure 1, the sections of the sheaths are connected by bond wires 20 and 21 in the following order: IA, IIB, IIIC, IVA, VB.

Further examination of Figure 1 will show that there are two other similar circuits of the sheath sections, one starting with section IB and the other starting with IC. Further, it will be seen that only one of these three sheath circuits is grounded in any one manhole by means of a jumper or wire 22 connected between the cross-bond 21 and a suitable ground 24, or to an auxiliary ground cable 23 which is preferably grounded at one or more points 24. Each of these three sheath circuits is grounded in turn in connective manholes.

It will be apparent to one skilled in the art that as we proceed progressively from left to right in Figure 1, there are three equivalent sheath circuits with one ground at each section point and with any one circuit grounded at every third point.

Referring now to Figures 2, 3 and 4, we have shown voltage vector diagrams for each of the above mentioned three sheath circuits, starting respectively in three consecutive sections I, II and III, each beginning at a grounded point, traversing in succession three sheath sections one of each phase, and returning to ground potential. It will be noted that the voltage vector diagrams are similar triangles, that the voltages between sheaths are similar in every manhole, that the maximum voltages that can occur between sheaths occur in the manholes and that this maximum voltage cannot exceed the voltage induced in one section length of the sheath. The three sheath voltages in the manhole 26 between sections III and IV of Figure 1, for example, are denoted by the distance between ground and the letters "X" in Figures 2, 3 and 4.

In order to more clearly emphasize the contrast between the voltage reduction between cable sheaths accomplished by our invention and that accomplished by a form of cross-bonding well known to the art in which the three cable sheaths are all solidly bonded together and grounded in every third manhole, reference may be had to Figure 5 of the drawings in which we have shown by vectorial representation the voltages between cable sheaths for this method. The three voltages between sheaths in two-thirds of the manholes in this case are the values between the letters "X" Figure 5. In actual value these voltages between cable sheaths in either of the two intermediate manholes are approximately the square root of three times the voltages induced in one sheath section between insulating sleeves.

This reduction of voltage between cable sheaths is accomplished in our invention without the use of special sheath bonding devices since ordinary wire is sufficient to furnish the desired bond. Our invention further accomplishes this voltage reduction without the requirement of any special apparatus other than a ground in every manhole or an auxiliary ground cable which is usually present in ordinary underground construction, such cables being normally electrically continuous and solidly bonded and grounded. We have found that our cross-bonding arrangement furthermore materially reduces the voltages between sheaths below that which would result by using any other form of sheath bonding at present known in the art and in which special bonding devices are not employed. In addition, it is to be observed that the sheath circuit in our cross-bonding arrangement is continuous for the three phases of the single-conductor cable line as a whole and, therefore, interruptions of short lengths in the auxiliary cable are permissible without adversely affecting the return path for failure currents in the sheath bonding connection of our invention. This is equally true as regards the omission of one or more ground points 24 where an auxiliary cable is not employed.

In Figures 6 and 7, we have illustrated two of the many possible methods of beginning or terminating sheath bonding in accordance with our invention. It is to be noted that in these figures the sections of cable sheath, the bond wires, and the auxiliary cable or equivalent grounds are all shown as single lines, these representations being merely schematic wiring diagrams the interpretation of which will be obvious to those skilled in the art.

In Figure 6, one single-phase impedance bonding device 25 is employed in each of the first two manholes adjacent to the solidly bonded terminal point for connecting the sheaths of the initial section of phase C with the sheath of the succeeding section of phase A. These impedance bonding devices are not essential and may be omitted if desired, their chief function being merely to act as an additional guarantee of the electrical continuity of the sheath circuit for returning line failure current.

In Figure 7 we have illustrated another method of beginning or terminating sheath bonding in accordance with our invention in which a special connection is necessary in only one manhole adjacent to the end of the line that is adjacent to the solidly bonded terminal point. Thus the sheaths of the end section of the three conductors are shown as not interconnected or not bridged except for one cross-bond 20. As in the case of the arrangement shown in Figure 6, the open ends of sheath sections may be interconnected or bridged with impedance sheath bonding devices such as 25 if desired, as a further guarantee of continuity of the sheath circuit.

It will be of course apparent that other beginning or terminating bonding arrangements to be employed with the cross-bond arrangement in accordance with our invention may be devised including cases where it is desired to continue the bonding according to some other arrangement either by utilizing the connections shown in Figures 6 and 7, or in other ways not illustrated, since many variations are possible.

While our invention has been thus far illustrated as applied to a three-phase system, it is obvious that the same principle and similar connections may be employed on metallic sheathed single-conductor cables for the transmission of single-phase, or polyphase currents in general, and it will be therefore understood that we do not limit ourselves to the application of the instant invention to a three-phase system.

In Figure 8 we have illustrated a single phase line, comprising two metallic sheathed single conductor cables, to which the principles of cross bonding as above disclosed have been applied. It is to be noted that in this figure the corresponding ends of each section of the sheath of one of the cables are grounded. In this figure the various parts similar to those previously described have been given similar reference numerals.

It will be further evident that the ground connection may be otherwise made, for example, between the center of the cable sheath lengths of the same phase in every section and the auxiliary ground cable or ground as illustrated in Figure 9. This location of the ground connection would be practical and desirable for cables buried directly in the earth. For such a case, the ground point in all the vector diagrams illustrated in Figures 2, 3 and 4 would be moved to the center of the base of each triangle if the ground connections were all made for example to the centers of sheath lengths on A-phase cable only. This vector diagram is illustrated in Figure 10. In this arrangement if we assume that the center of the A phase cable sheath is grounded then the maximum voltage to ground will occur at the cross bond between the B and the C phase cable sheaths. The maximum voltage to ground is, however, appreciably lower than in the cases previously described, being only approximately 86% of the voltage induced along one section of cable sheath.

In any event, the feature of essential importance in our invention is that the sheath sections be continuously cross-bonded throughout and that only one similarly positioned point of every consecutive sheath section (with occasional omissions where necessary) be grounded or connected to an auxiliary cable which is preferably grounded at one or more points.

While we have disclosed a preferred embodiment of our invention, it will be understood that we do not wish to be limited thereto. Changes may be made therein other than those above outlined without departing from the essence of the invention or the spirit and scope of the appended claims.

What we claim and desire to secure by Letters Patent is:

1. An electric circuit for transmitting alternating current comprising insulated conductors enclosed in metallic sheaths physically separated from each other, the sheaths comprising a plurality of sections serially electrically bonded to one another in a continuous transposed relation, and a grounding connection to one transposition bond at each transposition point.

2. An electric circuit for transmitting alternating current comprising insulated conductors enclosed in metallic sheaths physically separated from each other, the sheaths comprising a plurality of sections serially electrically bonded to one another in a continuous transposed relation, and one similarly connected transposition bond at each transposition point being grounded.

3. An electric circuit for transmitting poly-phase alternating currents comprising a plurality of insulated conductors, one for each phase, each enclosed in a metallic sheath physically separate from the other sheaths and divided into electrically discontinuous sections of approximately equal length, the adjoining sections of sheaths being serially connected to one another in a transposed relation, and a similarly positioned point of one cable sheath in each of several consecutive sections connected to ground.

4. An electric circuit for transmitting three-phase currents comprising three insulated conductors enclosed in metallic sheaths physically separated from each other and divided into insulated sections of approximately equal length with the sheath lengths serially connected to one another in a continuous transposed relation throughout, and one similarly connected transposition bond at each transposition point grounded to an auxiliary ground cable.

5. An electric circuit for transmitting three-phase currents comprising a line of three insulated conductors enclosed in metallic sheaths physically separated from each other, the sheath of each conductor being divided into electrically discontinuous sections of approximately equal length, the adjoining sections of sheaths being serially connected to one another in a transposed relation, and one similarly positioned sheath end of each section also connected to ground at consecutive transposition points along the line.

6. An electric power line transmitting alternating current over a plurality of single conductor metallic sheathed cables wherein the sheaths are divided into sections with adjacent sections of the same cable insulated from one another and wherein the sections are cross bonded to form separate sheath circuits each circuit including one section of each cable and wherein the respective sheath circuits are grounded, characterized by the fact that the ground connections for the respective circuits are displaced from one another by an amount substantially equal to one section length and are at electrically similar points.

7. An electric power line transmitting alternating current over a plurality of single conductor metallic sheathed cables wherein the sheaths are divided into sections with adjacent sections of the same cable insulated from one another and wherein the sections are cross bonded to form separate sheath circuits each circuit including one section of each cable and wherein the respective sheath circuits are grounded, characterized by the fact that the ground connections for the respective circuits are located at cross bonding points and displaced from one another by an amount substantially equal to one section length and are at electrically similar points.

8. A three phase electric power line, including three side by side metallic sheathed cables, one for each phase, each cable sheath comprising a plurality of sections insulated from one another, cross bonding between the sections producing three similar separate sheath circuits, ground connections to each sheath circuit at a plurality of points spaced three sections apart, characterized by the fact that the ground connections for the respective circuits are spaced from one another by the length of one section and are all at electrically similar points.

In witness whereof, we hereunto subscribe our names this 26 day of March, 1930.

KENNETH W. MILLER.
DENNEY W. ROPER.